(12) United States Patent
Gurol et al.

(10) Patent No.: US 8,109,353 B2
(45) Date of Patent: Feb. 7, 2012

(54) TRANSPORT SYSTEM INCORPORATING LINEAR MOTOR CHARGED ELECTRIC VEHICLE

(75) Inventors: Husam Gurol, Carlsbad, CA (US); Philip L. Jeter, San Diego, CA (US); Kurt M. Schaubel, Encinitas, CA (US)

(73) Assignee: General Atomics, San Diego, CA (US)

( * ) Notice: Subject to any disclaimer, the term of this patent is extended or adjusted under 35 U.S.C. 154(b) by 222 days.

(21) Appl. No.: 12/417,164

(22) Filed: Apr. 2, 2009

(65) Prior Publication Data

US 2010/0252340 A1 Oct. 7, 2010

(51) Int. Cl.
*B60K 1/00* (2006.01)
(52) U.S. Cl. ...................................... 180/65.1
(58) Field of Classification Search ................. 180/65.1, 180/167, 168
See application file for complete search history.

(56) References Cited

U.S. PATENT DOCUMENTS

| | | |
|---|---|---|
| 3,223,897 A | 12/1965 | Sullivan |
| 3,924,211 A | 12/1975 | Ioffe et al. |
| 4,061,089 A | 12/1977 | Sawyer |
| 4,498,023 A | 2/1985 | Stout |
| 5,175,456 A | 12/1992 | Neff et al. |
| 5,253,592 A | 10/1993 | Coffey |
| 5,323,133 A | 6/1994 | Heath et al. |
| 5,431,109 A | 7/1995 | Berdut |
| 5,473,233 A | 12/1995 | Stull et al. |
| 5,628,252 A | 5/1997 | Kuznetsov |
| 5,649,489 A | 7/1997 | Powell et al. |
| 5,722,326 A | 3/1998 | Post |
| 5,809,897 A | 9/1998 | Powell et al. |
| 5,904,101 A | 5/1999 | Kuznetsov |
| 6,044,770 A | 4/2000 | Davey et al. |
| 6,085,663 A | 7/2000 | Powell et al. |
| 6,129,025 A | 10/2000 | Minakami et al. |
| 6,152,045 A | 11/2000 | Powell et al. |
| 6,510,799 B2 | 1/2003 | Lamb et al. |
| 6,578,495 B1 | 6/2003 | Yitts et al. |
| 6,827,022 B2 | 12/2004 | van den Bergh et al. |
| 2004/0035315 A1 | 2/2004 | Richards |

*Primary Examiner* — Eric Culbreth
(74) *Attorney, Agent, or Firm* — Nydegger & Associates

(57) ABSTRACT

A system and method are provided for moving a vehicle along a roadway. The system includes at least one power segment that incorporates a multiple-phase winding. Structurally, the winding is embedded into the roadway for interaction with a magnet system mounted on the vehicle. With this interaction, a Linear Synchronous Motor (LSM) is established between the roadway and the vehicle to drive movement of the vehicle along the roadway. Also, the vehicle includes a mechanism for initially synchronizing a waveform speed of the multiple-phase winding with the speed of the vehicle. Further, the vehicle is able to selectively establish the LSM for use when desired.

20 Claims, 4 Drawing Sheets

TRANSPORT SYSTEM INCORPORATING LINEAR MOTOR CHARGED ELECTRIC VEHICLE

FIELD OF THE INVENTION

The present invention pertains generally to systems for driving all-electric vehicles. More particularly, the present invention pertains to systems that include windings embedded in the roadway to propel a vehicle by a Linear Synchronous Motor (LSM). The present invention is particularly, but not exclusively, useful as a system that provides a driving force to an already moving electric vehicle.

BACKGROUND OF THE INVENTION

It is well known that electric motors and generators can be respectively used to convert electrical energy into mechanical energy and mechanical energy into electrical energy. Basically, both a motor and a generator operate on related physical principles. They both also involve similar operational structures, namely: a conductor, a magnetic field and an electrical current. On the one hand, for a motor (conversion of electrical to mechanical energy) a conductor is located in a magnetic field and an electrical current is passed through the conductor. Consequently, the magnetic field will exert a force on the conductor. This force can then be mechanically transferred from the conductor to do work (e.g. rotate a wheel on a vehicle). On the other hand, for a generator (conversion of mechanical energy into electrical energy) a conductor is physically moved in a magnetic field. The consequence of this movement is that an electrical current is set up or induced in the conductor. This induced current can then be stored (e.g. recharging a battery).

A Linear Synchronous Motor (LSM) is a particular type of electrical motor wherein the conductor (e.g. a three-phase winding) is laid out in a substantially linear configuration. The magnetic field is then moved along a path substantially parallel to the layout of the conductor (winding). The resultant force can then be applied to move a vehicle in a direction along the conductor (winding).

In its configuration, an LSM is noticeably different from the more conventional electric motors that have interactive magnetic fields and conductors. Typically, but not necessarily, the magnetic field in a conventional arrangement is held stationary while the conductor is rotated in the magnetic field. Despite their obvious configuration differences, in all other important aspects the basic physics of an LSM and a conventional electric motor are essentially the same.

For many applications, and for many different reasons, an electrical power plant (i.e. an electric motor) may be preferable to other types of motors (e.g. a fossil fuel combustion engine). In particular, more and more land vehicles are being equipped with electrical power plants. For example, many automobile manufacturers are providing battery-powered cars. LSMs are also being increasingly considered for use as the propulsion units of trains traveling over extended sections of railway lines. An important consideration for the use of an LSM as a propulsion unit for a vehicle, however, is that it effectively confines travel of the vehicle to the roadways where a stationary component of the LSM (e.g. the conductor/winding) has been pre-positioned. In some applications, however, it may be desirable to avoid such a limitation in favor of a more flexible travel envelope. If so, energy consumption requirements can become a concern.

In light of the above, it is an object of the present invention to provide a system that uses an LSM to propel an all-electric vehicle that may be alternately propelled by a battery-powered electric motor. Another object of the present invention is to provide an LSM vehicle propulsion system that initially synchronizes a waveform speed of the multiple-phase winding with the speed of the vehicle. Still another object of the present invention is to provide an all-electric vehicle propulsion system that is easy to use, relatively simple to manufacture and comparatively cost effective.

SUMMARY OF THE INVENTION

An LSM propulsion system in accordance with the present invention moves an all-electric vehicle along a roadway. Structurally, the system includes at least one power segment having a multiple-phase winding embedded into the roadway. Importantly, the multiple-phase winding interacts with a magnet system mounted on the vehicle to establish the Linear Synchronous Motor (LSM) therebetween for movement of the vehicle along the roadway.

For propulsion, the system provides the vehicle with the ability to initially synchronize a waveform speed of the multiple-phase winding with the speed of the vehicle. Further, because the vehicle may operate on a non-LSM propulsion drive, the system provides a switch on the vehicle to selectively establish the LSM.

As intended for the present invention, the vehicle's non-LSM propulsion drive includes a motor that can be run as a generator when the vehicle is propelled by the LSM. In the motor mode, the vehicle uses the motor/generator as its propulsion unit with electrical energy from the battery to rotate the wheels of the vehicle for propulsion. Preferably, the motor is a synchronous permanent magnet motor capable of generating around 125 hp at approximately 1200 rpm. Alternately, when the vehicle is being propelled by the LSM, the motor/generator can be operated in its generator mode. In this mode, the rotating wheels of the vehicle interact with the motor/generator to recharge the battery.

To establish the LSM, the vehicle has an onboard magnet array that can be selectively deployed. When deployed, the magnet array is positioned adjacent the roadway over which the vehicle is traveling, with an air gap of approximately 5 cm therebetween. This then allows the magnetic field of the magnet to interact with an external electric power segment that is embedded into the roadway. For the operation of the LSM, the power segment for the LSM preferably includes a three-phase winding with an electric current provided by an external power source that passes through the winding. At this point, it is noted that the three-phase winding is only exemplary. As will be appreciated by the skilled artisan, different multiple-phase windings can be used, if desired.

Structurally, the electric motor/generator, the battery (e.g. ultra-capacitors) and a system control for alternately operating the motor/generator in either the motor mode or the generator mode are all mounted on the vehicle's undercarriage. Further, as stated above, the vehicle is also equipped with a magnet system. This magnet system is mounted on the undercarriage for movement between a retracted configuration and a deployed configuration. For the present invention, when the magnet system is in its retracted configuration, the vehicle is operated in the motor mode as disclosed above. On the other hand, when the magnet array is deployed, the LSM acts as the propulsion unit for the vehicle and the motor generator recharges the battery.

In more detail, the magnet system preferably includes a Halbach array of permanent magnets that is mounted on a support member. Further, the support member is preferably a back iron. Importantly, the Halbach array (permanent magnet) is provided to establish a magnetic field that will interact with the current in the multiple-phase winding of the power segment. Preferably, the LSM operates at approximately 15 Hz and the winding creates an LSM field having a waveform speed along the power segment of approximately 15 mph. As will be appreciated by the skilled artisan, LSM operation at 15 Hz and a waveform speed of 15 mph are exemplary. Correspondingly different LSM frequencies and waveform speeds can be used, if desired. Further, the power train of the vehicle includes a differential that is connected between the wheel and the electric motor, with the differential having an approximate 10.9 to 1 gear ratio. Additionally, a variable frequency inverter-rectifier is connected between the electric motor and the battery for charging the battery with a d.c. voltage when the motor/generator is operated in the generator mode, and for providing an a.c. voltage to energize the electric motor when it is operated in the motor mode.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
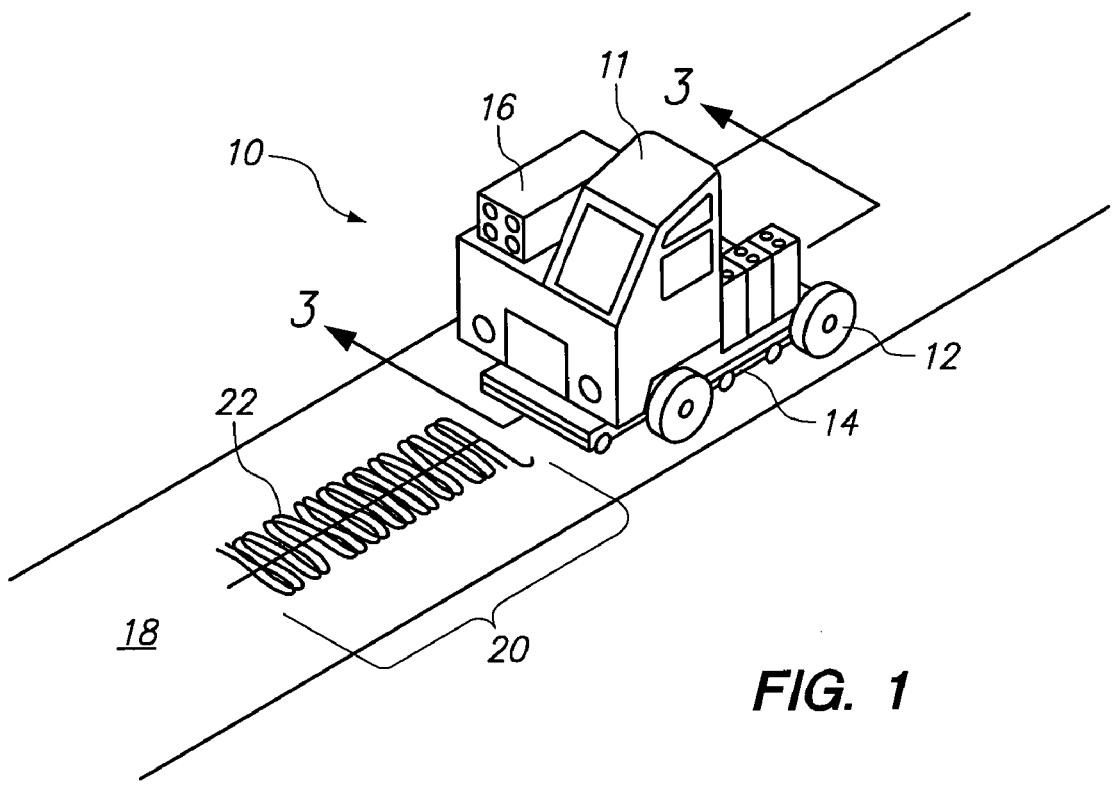
FIG. 1 is a perspective view of an all-electric vehicle in accordance with the present invention, with the vehicle shown traveling toward a power segment embedded into the roadway on which the vehicle is traveling.

Referring initially to FIG. 1 a vehicle-moving system is shown and is generally designated 10. In FIG. 1, an all-electric vehicle 11 is shown to be a wheeled vehicle that will typically have a plurality of wheels but must necessarily have at least one wheel 12. As will be appreciated by the skilled artisan, the vehicle 11 can essentially be any kind of wheeled land vehicle known in the pertinent art. The vehicle (tractor) 11 shown in the drawings is only exemplary. FIG. 1 also indicates that a magnet system 14 is mounted on the vehicle 11 substantially as shown, and that the vehicle 11 carries at least one battery 16. For purposes of the present invention, the battery 16 preferably includes ultra-capacitors having an electrical energy capability of about eight mega-joules. Note: as a practical matter there may be a plurality of batteries 16 carried on the vehicle 11. FIG. 1 also shows that for at least a portion of its travel time, the vehicle 11 is expected to travel along a roadway 18 that includes a power segment 20 which is preferably embedded into the roadway 18. More specifically, the power segment 20 comprises a three-phase winding 22 that receives an electrical current from an external power source (not shown).

Figure 2:
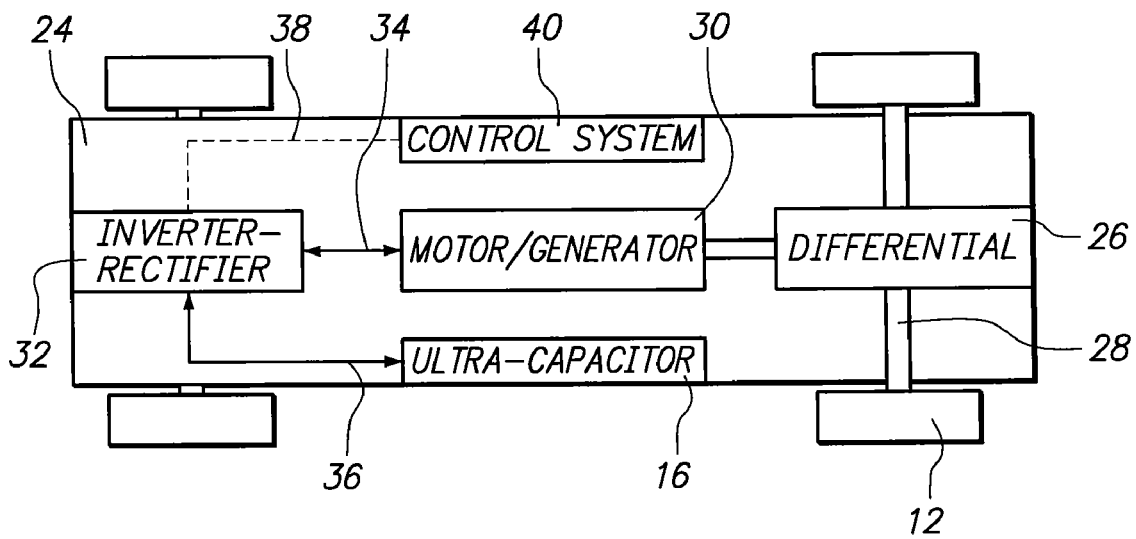
FIG. 2 is a block diagram of the electrical system employed by the present invention for the all-electric vehicle.

Referring now to FIG. 2, a schematic block diagram of components for the vehicle 11 is shown with the components arranged on an undercarriage 24 of the vehicle 11. In this arrangement, a wheel 12 of the vehicle 11 is connected to a differential 26 via an axle 28. In turn, the differential 26 is connected directly to a motor/generator 30. For purposes of the present invention, the differential 26 preferably has around a 10.9 to 1 gear ratio, and the motor/generator 30 preferably incorporates a permanent magnet motor that operates with approximately 1445 rpm at 15 mph. FIG. 2 also shows that the motor/generator 30 is connected to an inverter-rectifier 32 via an a.c. line 34, and that the battery (ultra-capacitor) 16 is connected to the inverter-rectifier 32 via a d.c. line 36. Further, FIG. 2 indicates by the dashed-line 38 that a control system 40 onboard the vehicle 11 can be used to alternate the operation of the inverter-rectifier 32 and thereby cause the motor/generator 30 to operate in either a motor mode or a generator mode.

To operate the motor/generator 30 in its motor mode, the control system 40 is used to direct the inverter-rectifier 32 to convert a d.c. voltage from the battery 16 into an a.c. voltage for operating the motor/generator 30 as a motor. Accordingly, the motor/generator 30 provides power to rotate the wheel 12. Thus, the motor/generator 30 acts as a propulsion unit for the vehicle 11 when the motor/generator 30 is operated in its motor mode. Alternately, for the motor/generator 30 to operate in its generator mode, the inverter-rectifier 32 is controlled by the control system 40 to convert an a.c. voltage from the motor/generator 30 into a d.c. voltage for recharging the battery 16. In this generator mode, a rotation of the wheel 12 causes the motor/generator 30 to generate the a.c. voltage that is converted by the inverter-rectifier 32 into the d.c. voltage that recharges the battery 16.

As noted above, the vehicle 11 alternately uses two different propulsion units. One propulsion unit is established when the motor/generator 30 is operated in its motor mode as disclosed above. The other propulsion unit is a Linear Synchronous Motor (LSM). Thus, an important aspect of the present invention concerns how a Linear Synchronous Motor (LSM) is established as a propulsion unit for the vehicle 11. How this is accomplished is best appreciated with reference to FIGS. 3A and 3B.

Figure 3A:
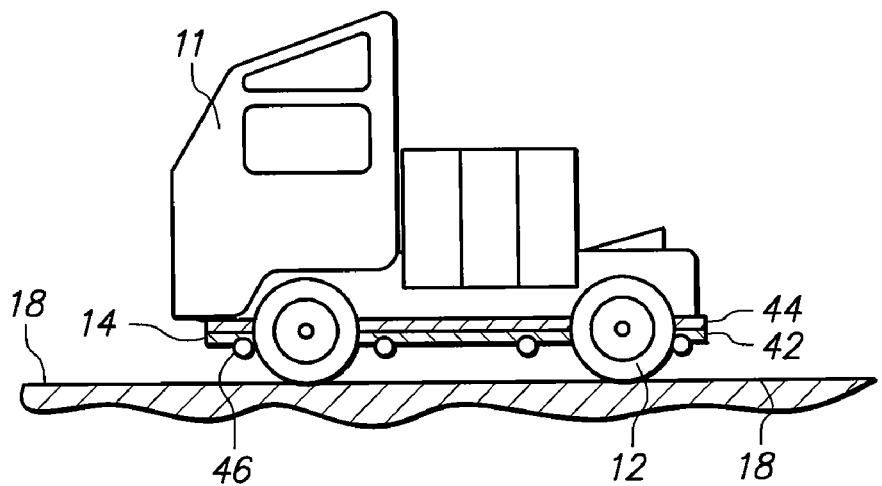
FIG. 3A is a side elevation view of the all-electric vehicle with its magnet array in a retracted configuration, with the magnet array shown in cross section as seen along the line 3-3 in FIG. 1.
Figure 3B:
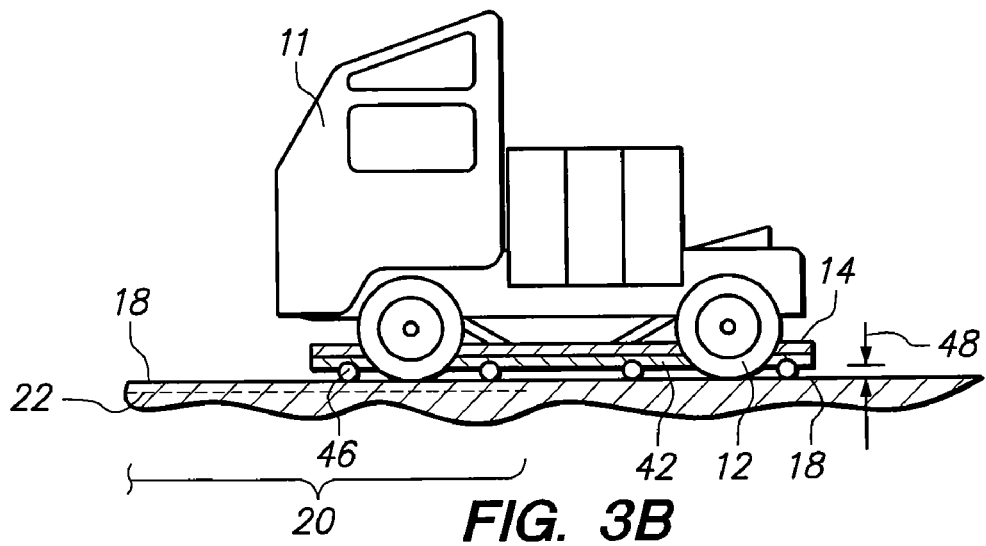
FIG. 3B is a view of the vehicle as seen in FIG. 3A with the magnet array in a deployed configuration.
Figure 4:
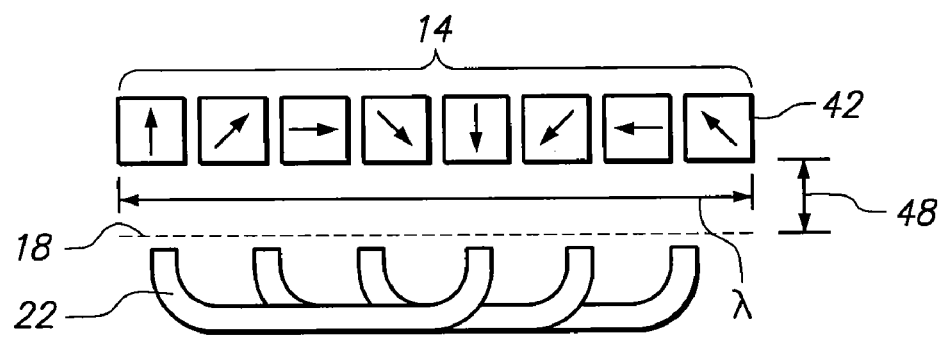
FIG. 4 is a representative cross section view of a portion of the magnet array and a portion of the power segment as seen along the line 3-3 in FIG. 1.

In FIG. 3A, the magnet system 14 is shown in a retracted configuration wherein the magnet system 14 is effectively distanced from the roadway 18. FIG. 3A also shows that the magnet system 14 includes permanent magnets 42 that are mounted on a support member 44 that can act as a back iron for the permanent magnets 42. Additionally, it is seen that the magnet system 14 includes a plurality of vertical clearance wheels, of which the vertical clearance wheel 46 is exemplary. In FIG. 3B, the magnet system 14 is shown in a deployed configuration wherein the magnet system 14 is deployed (i.e. lowered) toward the roadway 18 until the vertical clearance wheel(s) 46 makes contact with the roadway 18. With this contact, the permanent magnets 42 of the magnet system 14 are at a distance 48 from the surface of the roadway 18. Preferably, the distance 48 is approximately five centimeters. For purposes of the present invention, the magnet system 14 can be any type magnet well known in the pertinent art, such as a Halbach Array shown in FIG. 4. In any event, as indicated in FIG. 4, when the magnet system 14 has been deployed, it is close enough to the three-phase winding 22 for the magnetic field of the permanent magnets 42 to directly interact with the electric field of the three-phase winding 22. This interaction then provides a propulsive force for the vehicle 11. In this arrangement for the LSM, the three-phase winding 22 is preferably operated at about fifteen Hz, to create a waveform speed (i.e. a speed for vehicle 11) of about fifteen mph.

In its operation, the vehicle 11 can travel along the roadway 18 by selectively using either of two propulsion units. The selection, however, is dependent on whether the vehicle 11 is traveling over an embedded power segment 20. Specifically, when the vehicle 11 is traveling over a power segment 20, an LSM propulsion unit can be created between the magnet system 14 on the vehicle 11 and the three-phase winding 22 embedded in the roadway 18. This is done by lowering the magnet system 14 into a deployed configuration (see FIG. 3B) as the vehicle 11 approaches the power segment 20. An engagement of the magnetic field of the magnet system 14 with the electric waveform of the three-phase winding 22 is accomplished by having the speed of the vehicle 11 substantially correspond with the speed of the waveform (e.g. 15 mph). Once established, the LSM can thereafter effectively function as the propulsion unit of the vehicle 11.

Importantly, for purposes of the present invention, as the vehicle 11 is being propelled over a power segment 20 in the roadway 18 by the LSM, the battery 16 can be recharged. Specifically, as the vehicle 11 moves along the roadway 18 under the influence of the LSM, the wheel 12 is rotated by its contact with the roadway 18. This rotation of the wheel 12 is then used to generate an a.c. voltage with the motor/generator 30 (i.e. the motor/generator 30 is in its generator mode). The a.c. voltage is then converted to a d.c. voltage by the inverter-rectifier 32 for use in recharging the battery 16.

When the vehicle 11 is not traveling over a power segment 20, and therefore can no longer establish an LSM with its magnet system 14, the magnet system 14 is raised to its retracted configuration (see FIG. 3A). In this case, the vehicle 11 operates with an electric motor as its other propulsion unit. Specifically, with the motor/generator 30 now directed by the control system 40 to operate in the motor mode, electrical power from the battery 16 is passed through the inverter-rectifier 32 and to the motor/generator 30 to run the motor/generator 30 as a motor (i.e. the motor/generator 30 is in its motor mode). Thus, the motor/generator 30 functions as a propulsion unit to rotate the wheel 12 for propulsion of the vehicle 11.

Figure 5:
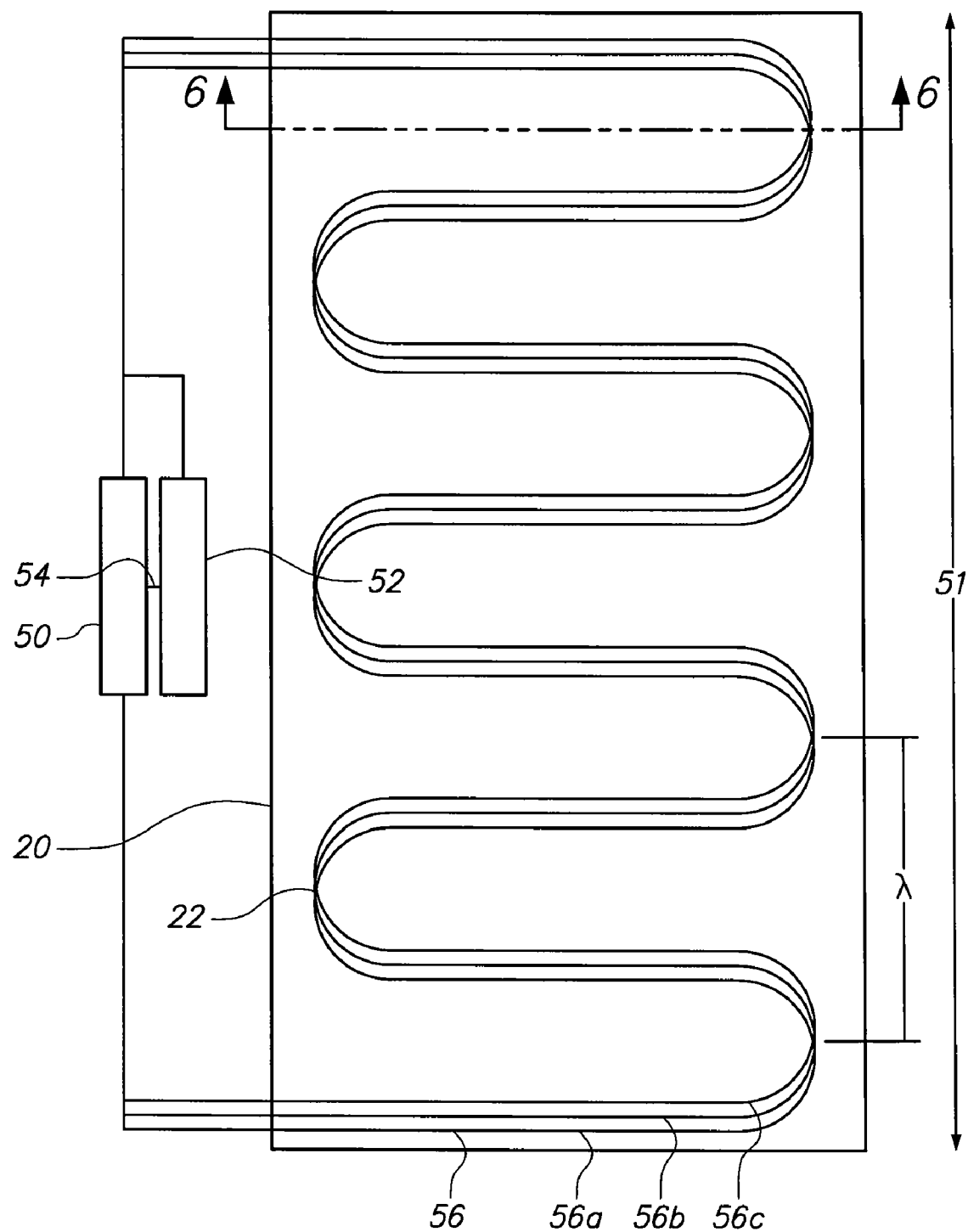
FIG. 5 is an overhead view of the power segment.

Referring now to FIG. 5, the structure of the power segment 20 is shown in greater detail. Though exemplary, in FIG. 5, the power segment 20 includes a three-phase winding 22. As shown, the winding 22 provides a propulsion current to drive movement of the vehicle 11 (shown in FIG. 1). Further, the winding 22 is connected to a control 50 for a Linear Synchronous Motor (LSM). More specifically, the LSM control 50 is used to move the vehicle 11 in the direction of arrows 51 in a manner well known in the pertinent art. This propulsion of the vehicle 11 is possible, due to connections between the LSM control 50 and the winding 22. For the system 10 of the present invention, the LSM control 50 uses input from a signal processor 52 for its operation. This interconnection is accomplished by line 54 shown between the signal processor 52 and the LSM control 50 in FIG. 5.

Cross-referencing FIG. 5 with FIG. 4, it is to be appreciated that because of the arrangement of the magnets 42 in the magnet system 14, the orientation of the magnetic field (i.e. the field vector) rotates along the vehicle 11. It is to be further appreciated that within the plane of the page, the vertical component of the magnetic field varies sinusoidally along the vehicle 11. FIG. 4 shows the wavelength, $\lambda$, of this sinusoidal variation.

For the system 10, a number of configurations for establishing one or more wavelengths, $\lambda$, of magnetic field along the vehicle 11 may be used. For example, four, eight, twelve, sixteen or some other multiple of four magnets 42 can be appropriately arranged to establish a magnetic field having a vertical component that varies sinusoidally through one wavelength $\lambda$, along the vehicle 11. Additionally, one can imagine single strips of magnetic material magnetized to produce one wavelength, $\lambda$, of sinusoidally varying magnetic field along the vehicle 11. Alternatively, the use of non-permanent magnets, such as electrically energized coils, may be employed to establish one wavelength, $\lambda$, of sinusoidally varying magnetic field along the vehicle 11.

Further, in FIG. 5, the winding 22 is shown to include "N" separate coils 56 and has a wavelength, $\lambda$. As illustrated, N=3, and the three coils 56a, 56b, 56c are linearly aligned across the roadway 18 such that there is a phase difference of "$\lambda/N$" or "$\lambda/3$" between adjacent coils 56.

Figure 6:
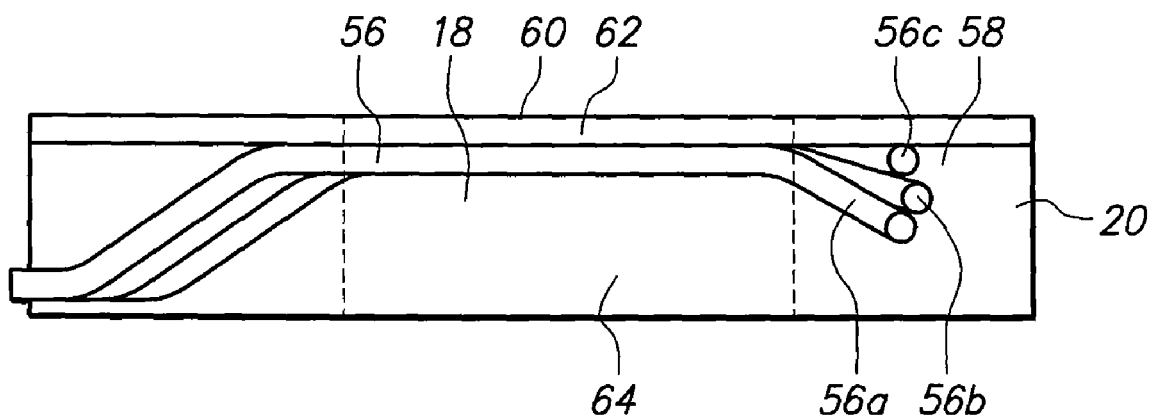
FIG. 6 is a cross-section view of the power segment, taken along line 6-6 in FIG. 5.

Referring now to FIG. 6, the structure of the power segment 20 may be more clearly understood. As shown in FIG. 6, the coils 56 in the winding 22 are vertically distanced from one another in the turn-around sections 58. In the roadway 18, the coils 56 are parallel to one another and are positioned in a plane parallel to the top surface 60 of the roadway 18. Further, as shown, a steel top plate 62 is employed to cover the winding 22. Beneath the steel top plate 62, the winding 22 is embedded in reinforced concrete 64.

While the particular Transport System Incorporating Linear Motor Charged Electric Vehicle as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims. Further, it is noted that while the illustrations describe a winding having three coils, other pluralities of coils are envisioned for use.

What is claimed is:

1. A system for moving a vehicle along a roadway which comprises:
    at least one power segment having a three-phase winding embedded into the roadway for interaction with a magnet system mounted on the vehicle to establish a Linear Synchronous Motor (LSM) therebetween for movement of the vehicle along the roadway;
    a means on the vehicle for initially synchronizing a waveform speed of the three-phase winding with the speed of the vehicle; and
    a means on the vehicle for selectively establishing the LSM.

2. A system as recited in claim 1 wherein the waveform speed is constant.

3. A system as recited in claim 2 wherein the waveform speed is approximately 15 mph.

4. A system as recited in claim 3 wherein the LSM operates at approximately 15 Hz.

5. A system as recited in claim 1 further comprising a propulsion drive mounted on the vehicle, wherein the propulsion drive is selectively activated to move the vehicle along the roadway as an alternative to the LSM.

6. A system as recited in claim 1 further comprising a stainless steel top plate covering the power segment.

7. A system as recited in claim 6 wherein the winding is embedded in reinforced concrete.

8. A system for moving a vehicle including a magnet system along a roadway which comprises:

at least one power segment having a three-phase winding embedded into the roadway for interaction with the magnet system to establish a Linear Synchronous Motor (LSM) therebetween for movement of the vehicle along the roadway;

a means on the vehicle for initially synchronizing a waveform speed of the three-phase winding with the speed of the vehicle; and a means on the vehicle for selectively establishing the LSM.

9. A system as recited in claim 8 further comprising a propulsion drive mounted on the vehicle, wherein the propulsion drive is selectively activated to move the vehicle along the roadway as an alternative to the LSM.

10. A system as recited in claim 8 wherein the waveform speed is constant.

11. A system as recited in claim 10 wherein the waveform speed is approximately 15 mph.

12. A system as recited in claim 11 wherein the LSM operates at approximately 15 Hz.

13. A system as recited in claim 8 further comprising a stainless steel top plate covering the power segment.

14. A system as recited in claim 13 wherein the winding is embedded in reinforced concrete.

15. A method for moving a vehicle including a magnet system along a roadway which comprises the steps of:

embedding at least one power segment having a three-phase winding into the roadway;

interacting the power segment with the magnet system to establish a Linear Synchronous Motor (LSM) therebetween for movement of the vehicle along the roadway;

initially synchronizing a waveform speed of the three-phase winding with the speed of the vehicle; and selectively establishing the LSM.

16. A method as recited in claim 15 wherein the waveform speed is constant.

17. A method as recited in claim 16 wherein the waveform speed is approximately 15 mph.

18. A method as recited in claim 17 wherein the LSM operates at approximately 15 Hz.

19. A method as recited in claim 15 further comprising the step of covering the power segment with a stainless steel top plate.

20. A method as recited in claim 19 wherein the embedding step comprises embedding the winding in reinforced concrete in the roadway.

\* \* \* \* \*